United States Patent [19]

Schutte

[11] Patent Number: 4,752,990

[45] Date of Patent: Jun. 28, 1988

[54] FASTENING DEVICE FOR ROPE

[76] Inventor: Gary R. Schutte, Box 80, Benson City, Mo. 65232

[21] Appl. No.: 63,669

[22] Filed: Jun. 19, 1987

[51] Int. Cl.$^4$ .............................................. F16G 11/00
[52] U.S. Cl. ................................ 24/115 R; 24/115 G; 24/241 PS
[58] Field of Search ............. 24/115 R, 115 G, 136 L, 24/241 PS, 241 SB; 258/1.8; 294/82.19

[56] References Cited

U.S. PATENT DOCUMENTS

| 21,398 | 8/1858 | Rogers | 24/115 G |
|---|---|---|---|
| 1,064,123 | 6/1913 | Bayuk . | |
| 1,144,415 | 6/1915 | Jones | 294/82.19 |
| 1,200,012 | 10/1916 | Oldham | 24/136 L |
| 1,387,358 | 8/1921 | Costello | 24/115 G |
| 1,650,038 | 11/1927 | Potter | 294/82.19 |
| 1,873,917 | 8/1932 | Ashley . | |
| 2,215,049 | 9/1940 | Minor . | |
| 2,385,274 | 9/1945 | Hammond | 24/115 G |
| 2,869,872 | 1/1959 | Nissen | 24/115 R |
| 2,942,315 | 6/1960 | Johnson . | |
| 3,008,210 | 11/1961 | Stovern | 294/82.19 |
| 3,104,926 | 9/1963 | Scoville | 24/115 R |
| 3,115,381 | 12/1963 | Hoag | 24/115 R |
| 3,233,934 | 2/1966 | Osborn et al. . | |
| 3,766,610 | 10/1973 | Thorsbakken . | |
| 3,827,746 | 8/1974 | Byers . | |
| 4,401,333 | 8/1983 | Merry | 24/241 PS |

FOREIGN PATENT DOCUMENTS

| 188645 | 1/1957 | Austria | 24/136 L |
|---|---|---|---|
| 447051 | 12/1912 | France | 24/241 PS |

Primary Examiner—Victor N. Sakran
Attorney, Agent, or Firm—Gravely, Lieder & Woodruff

[57] ABSTRACT

A fastening device for connecting a rope to an object includes a shank which contains an aperture through which the rope loops, and in addition a hook at one end of the shank. The hook carries a keeper which pivots on it between closed and open positions, and is urged to its closed position by a coil-type compression spring which encircles the shank. The spring creates rope channels along the sides of the shank, and these channels confine the rope so as to maintain the loop at the aperture. However, the spring may be compressed to expose the aperture so that the rope may be maneuvered through it.

20 Claims, 2 Drawing Sheets

FASTENING DEVICE FOR ROPE

BACKGROUND OF THE INVENTION

This invention relates in general to fastening devices and, more particularly, to a fastening device for securing a rope.

The traditional procedure for securing a rope to an object that is to be tethered by the rope or to serve as an anchor for the rope is to provide the object with an eye or similar aperture or to provide it with a cleat. Where an eye exists it must be large enough to receive the rope, for the rope must pass through it. Usually the rope is knotted beyond the eye, but knots often draw tight and cannot be undone without considerable effort, particularly when the rope becomes wet. Cleats, on the other hand, occupy considerable space and are suitable for use only on large objects, such as docks and boats.

It is desirable to have a simple mechanism which enables a rope to be secured to a relatively small object, such as a hook, without knotting the rope, and which further enables the rope to be easily moved relative to the object and secured in different positions, all with minimal effort.

DESCRIPTION OF THE DRAWINGS

In the accompanying drawings which form part of the specification and wherein like numerals and letters refer to like parts they occur—

DETAILED DESCRIPTION

Figure 1:
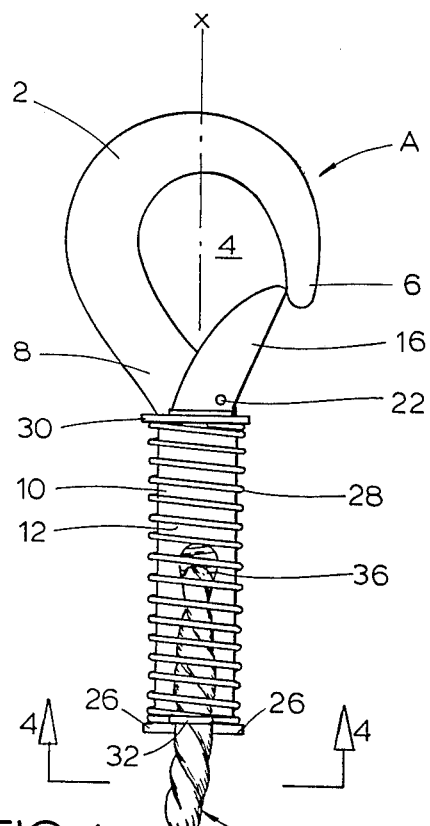
FIG. 1 is a side elevational view of a fastening device constructed in accordance with and embodying the present invention with the device being attached to a rope pursuant to the invention.

Referring now to the drawings, a fastening device A (FIGS. 1 & 2) receives a rope B and normally grips the rope B quite securely so that the rope B does not slip through the device A. However, with a minimal amount of manipulation the fastening device A releases its grip, so that the rope B may be moved to another position on it or else removed from it altogether.

Figure 3:
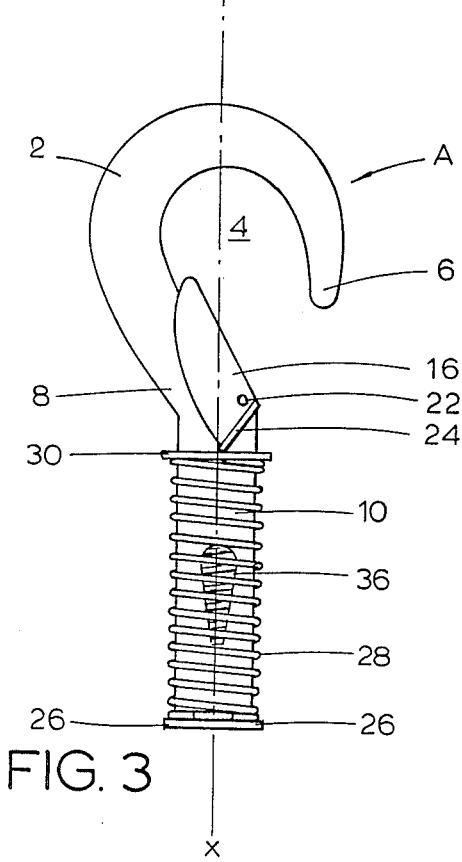
FIG. 3 is a side elevational view of the fastening device similar to FIG. 1, but showing the keeper for the hook in its open position.

The fastening device A includes a hook 2 (FIGS. 1 & 3) which curves about an enclosed area 4 from a free end 6 to a connected end 8, its width diminishing toward the free end 6. At the connected end 8 the hook 2 merges into a shank 10 having a straight axis x which if extended would generally bisect the enclosed area 4. While the cross-sectional configuration of the hook 2 is not very critical, the shank 10 should be relatively thin, and to this end it may have parallel side faces 12 which are about as wide as the connected end 8 of the hook 2 and parallel edges 14 which are quite narrow. Thus, in cross-section the shank 10 resembles an elongated rectangle.

Figure 6:
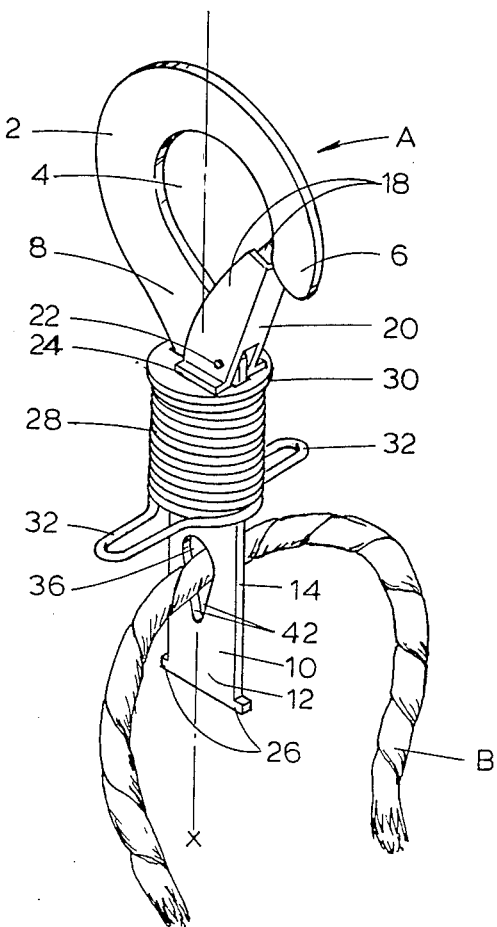
FIG. 6 is a perspective view showing the fastening device with its spring compressed and further with a rope passing through the aperture that is normally covered by the spring.

At its connected end 8 the hook 2 is fitted with a keeper 16 (FIG. 1) which normally extends from the connected end 8 to the free end 6, so that the hook 2 together with the keeper 16 totally circumscribe the enclosed area 4. However, the keeper 16 is capable of pivoting backwardly into the enclosed area 4 so as to open the hook 2, and this permits the hook 2 to be passed over or otherwise engaged with another object. More particularly, the keeper 16 is formed from a strip of sheet metal which is doubled back on itself into a bifurcated configuration so as to have spaced apart walls 18 that are joined along a bight 20 (FIG. 6). The two walls 18 of the keeper 16 fit along opposite sides of the hook 2, with the bight 20 being presented outwardly away from the enclosed area 4, and here the hook 2 and keeper 10 are joined together by a pivot pin 22 which passes through the connected end 8 of the former and the two walls 18 of the latter. The pin 22 enables the keeper 20 to swing from a closed position (FIG. 1), in which it blocks access to the enclosed area 4, to an open position (FIG. 3), in which it lies within the enclosed area 4 and thus affords access to the area 4 through the space between the free and connected ends 6 and 8 of the hook 2. When in the closed position, the free end of the keeper 20 bears against the inner margin of the hook 2 at the free end 6 thereof. On the other hand, when the keeper 16 is in its fully open position, its side walls 18 lie along the sides of the hook 2 in the region of the connected end 8. The keeper 16 on each of its walls 18 has an end flange or margin 24 which is oblique to the bight 20. When the keeper 16 is in its closed position, the end margins 24 lie along the shank 10 in the region where the shank 10 and hook 2 merge, and moreover are perpendicular to the axis x of the shank 10. On the other hand, when the keeper 16 is in its open position, the end margins 24 are oblique to the axis x.

Figure 4:
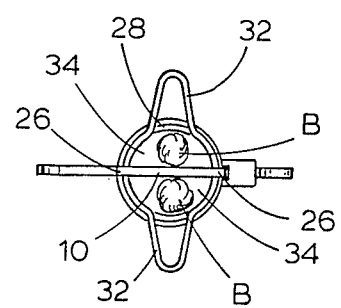
FIG. 4 is an end elevational view of the fastening device taken along line 4—4 of FIG. 1.

The shank 10 at its opposite end, that is its free end, is fitted with stops 26 (FIGS. 1 & 6) which projects laterally beyond both edges 14. Between the stops 26 and the hook 2 at the other end of the shank 10, the shank 10 is encircled by a coil-type compression spring 28 which exists in a state of compression. Actually, the spring 28 does not contact the keeper 16, but instead bears against a circular flat washer 30 which in turn bears against the end margins 24 of the keeper 20. The washer 30 is slightly larger in diameter than the spring 28 and contains a slot which, being somewhat larger than the cross-section size of the shank 10, loosely receives the shank 10. The spring 28 urges the washer 30 against the end margins 24 of the keeper 16, and as a consequence the end margins 24 tend to assume the orientation of the washer 30, that is an orientation perpendicular to the axis x of the shank 10. Thus, the spring 28, acting through the washer 30 urges the keeper 16 to its closed position and will retain the keeper 16 in that position unless the keeper 16 is physically displaced to its open position. At the stop 26 the spring 28 has outwardly directed tabs 32 (FIGS. 2, 4 & 6) which enables one to conveniently apply an axially directed force to the end of the spring 28 so as to move that end away from the stop 26, or in other words, compresses or contracts the spring 28. In this regard, the width of the shank 10, that is the distance between its side edges 14, is only slightly less than the inside diameter of the spring 28, so that the spring 28 is compressed without restraint from the shank 10. Since the shank 10 is quite thin, considerable space exists between each of its side faces 12 and the surrounding convolutions of the spring 28, and indeed these spaces form channels 34 for receiving the rope B (FIG. 4). Each rope channel 34 is thus somewhat wider than the diameter of the rope B and easily accommodates a segment of the rope B.

Figure 2:
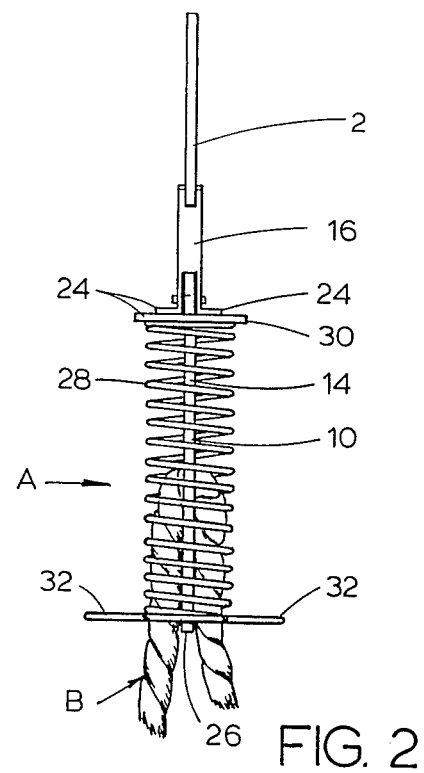
FIG. 2 is an end elevational view of the fastening device.
Figure 5:
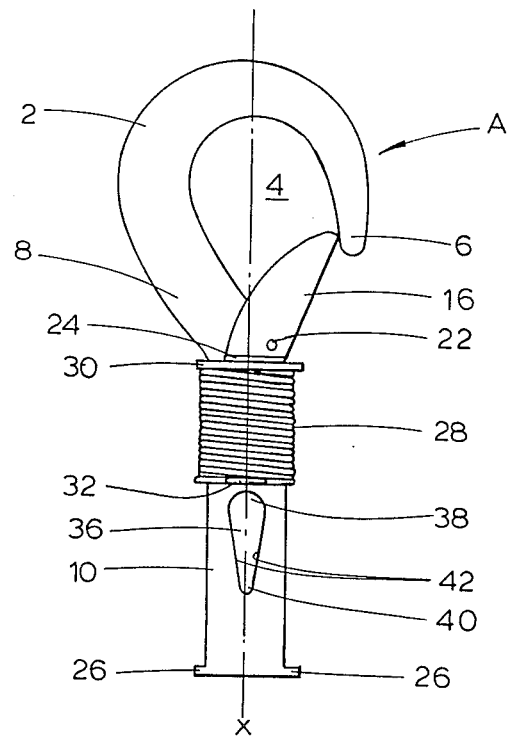
FIG. 5 is a side elevational view of the fastening device similar to FIG. 1, but showing the spring compressed to expose the aperture/through which the rope loops.

Within the shank 10 is an elongated aperture 36 (FIG. 5), the major axis of which lies coincident to the axis x of the shank 10. The aperture 36 has large and small arcuate ends 38 and 40, and side margins 42 which converge toward the small end 40. The large end 38 is presented toward the hook 2, and here the aperture 36 is large enough to receive the rope B—indeed, large enough to receive the rope B with enough clearance to enable it to slide easily through the aperture 36 (FIG. 6). On the other hand, the width of the aperture 36 at the small end is somewhat less than the diameter of the rope B. Thus, somewhere between the large and small diameter ends 38 and 40, the rope B will become lodged between the converging side margins 42. When doubled back upon itself toward the free end of the shank 10, the rope B is capable of lodging tightly enough to avoid slippage through the aperture 36 (FIG. 1). Indeed, that is the configuration into which the spring 28 directs the rope B when the spring is extended to and is against the stop 26 at the end of the shank 10. With the spring 28 so extended, the rope B lies within the rope channels 34 opposite the side faces 12 and loops through the aperture 36 (FIGS. 2 & 4). Even a very slight force applied to the rope B draws it tighty between the converging margins 42 of the aperture 36, ensuring that the shank 10 holds the rope B fast. The aperture 36 is located far enough from the hook 2 to enable the portion of the shank 10 that is between the hook 2 and the aperture 36 to accommodate the entire spring 28 when the spring 28 is fully contracted or compressed (FIG. 5). Thus, it is possible to fully expose the aperture 36 by moving that end of the spring 28 having the tabs 32 over the small and large ends 38 and 40 of the aperture 36 and thereby compressing the spring 28 from its extended condition to its contracted or retracted position.

To connect the fastening device A to the rope B, the spring 28 of the fastening device A is forced over the shank 10 until it is compressed into the region between the aperture 36 and the connected end 8 of the hook 2, this being achieved by applying a moderate force to the spring 28 at its tabs 32. With the spring 28 so compressed, the aperture 36 is completely exposed (FIG. 5). The end of the rope B is inserted into the aperture 36 at the large end 38 and advanced until that portion of the rope B which is to be secured at the fastening device is within the aperture 36 (FIG. 6). At this time the rope B is doubled back along the shank 10 in the direction of the free end of the shank 10, so that a segment lies along one side face 12 of the shank 10 and another lies along the other side face 12. Then the two segments are tugged gently to bring the loop that connects them toward the small end 40 of the aperture 36. The rope B at its loop lodges between the converging side margins 42 of the aperture 36 and will no longer slide in the aperture 36. Thereupon the tabs 32 of the spring 28 are released, and the spring 28 expands axially over the rope B until its tabs 32 reach the stop 26 (FIGS. 1 & 2). As such it captures the doubled back portion of the rope B in the two rope channels 34 that it creates along the side faces 12 of the shank 10. The rope B remains secured and cannot be dislodged from the shank 10 unless the spring 28 is again contracted.

Of course, to reposition the fastening device A on the rope B or to remove it altogether from the rope B, the spring 28 is retracted far enough to expose the full aperture 36, whereupon the rope B is moved to the appropriate position on the shank 10 or withdrawn altogether. Then the tabs 32 of the spring 28 are released, and the spring 28 is allowed to return to its extended condition wherein its one end bears against the stops 26.

The hook 2 engages an eye or some other device much like any other hook, but in so doing its keeper 16, in swinging to the open position, slightly compresses the spring 28, for the spring 28 urges the keeper 16 to its closed position and normally holds it in that position.

Of course, either or both segments of the rope B are attached to that which is anchored by the fastening device A.

This invention is intended to cover all changes and modifications of the example of the invention herein chosen for purposes of the disclosure which do not constitute departures from the spirit and scope of the invention.

What is claimed is:

1. A fastening device for securing a rope, said device comprising: an elongated shank having a free end and an opposite end as well as sides and an aperture that opens laterally out of the sides remote from the free end; a rope extended through that aperture, where it forms a loop, and having doubled back segments that extend along the sides of the shank, with at least one segment extending beyond the free end of the shank; and retaining means encircling the shank for holding the segments of the rope along the shank, so that the loop remains in the rope at the aperture, the retaining means being normally in an extended position wherein it covers the aperture, but being movable along the shank to a retracted position wherein it exposes the aperture so that the rope can be straightened somewhat and maneuvered through the aperture, the retaining means being resiliently urged to its extended position.

2. A fastening device according to claim 1 wherein the retaining means comprises a coil-type compression spring.

3. A fastening device according to claim 2 wherein the shank has stops at the free end thereof beyond which the rope extends and the spring normally bears against the stops in a somewhat compressed condition when the spring is in its extended position.

4. A fastening device according to claim 3 wherein the spring has tabs at the end thereof which normally bears against the stops, with the tabs projecting generally radially from the spring to facilitate moving the spring to its retracted position.

5. A fastening device according to claim 2 wherein the shank is thinner than it is wide so that two channels are formed between the side faces of the shank and the convolutions of the spring; and wherein the segments of the rope are located in the channels when the spring is in its extended position against the stop.

6. A fastening device according to claim 5 wherein the aperture has large and small ends and converging side margins extending between the large and small ends, the small end being presented toward and the large end away from that end of the shank beyond which the segment of the rope extends, the large end of the aperture being large enough to loosely receive the rope, the convergence of the side margins being sufficient to enable the rope to lodge between and be gripped by the side margins when the loop therein is moved from the large end toward the small end of the aperture.

7. A fastening device according to claim 5 and further comprising a hook attached to the opposite end of the shank.

8. A fastening device according to claim 7 wherein the hook has a connected end and a free end and between the two ends extends along an enclosed area; and further comprising a keeper which pivots at the connected end of the hook between a closed position, wherein it extends to the free end of the hook, and an open position, wherein it is located within the enclosed area; and wherein the spring acts against the keeper and urges it to its closed position.

9. A fastening device according to claim 8 wherein the keeper has end margins which are presented toward the spring and are generally perpendicular to the axis of the spring when the keeper is in its closed position; and wherein the spring acts against the end margins of the spring and urges the keeper to its closed position.

10. A fastening device comprising: a hook having a free end and a connected end and defining an enclosed area between the two ends; a keeper connected to the hook at the connected end thereof and being capable of pivoting between a closed position wherein it extends to the free end and an open position wherein it projects into the enclosed area; a shank attached to the connected end of the hook and projecting away from the enclosed area of the hook, the shank having an aperture which opens laterally out of its sides; and a spring encircling the shank at the aperture and acting against the keeper to urge the keeper toward its closed position, the convolutions of the spring being spaced from the sides of the shank beyond the aperture so that two rope channels exist between the spring convolutions and the sides of the shank for accommodating a rope that can be looped through the aperture, the spring being compressible toward the hook sufficiently to expose the aperture so that the rope may be straightened somewhat and maneuvered through aperture.

11. A fastening device according to claim 10 wherein the keeper has end edges which lie generally perpendicular to the axis of the spring when the keeper is in its closed position; and wherein one end of the spring applies an axially directed force to the end edges of the keeper.

12. A fastening device according to claim 10 wherein the shank has a stop at its opposite end and the spring normally bears against the stop, but is moved away from the stop to expose the aperture.

13. A fastening device according to claim 12 wherein the spring has radially directed tabs at the end thereof that is normally against the stops for facilitating compression of the spring to expose the aperture.

14. A fastening device according to claim 10 wherein the aperture has a large end and a small end and converging side margins between the large and small ends, the large end being presented toward the hook and the small end being presented away from the hook.

15. A fastening device according to claim 14 and further comprising a rope extended through the rope channels and also through the aperture where it forms a loop, the rope at the loop therein being lodged between the side margins of the aperture.

16. A fastening device according to claim 15 wherein the aperture at its large end is large enough to loosely receive the rope.

17. A fastening device according to claim 1 wherein the aperture has large and small ends and converging side margins extending between the large and small ends, the small end being presented toward and the large end away from the free end of the shank beyond which the segment of the rope extends, the large end of the aperture being large enough to loosely receive the rope, the convergence of the side margins being sufficient to enable the rope to lodge between and be gripped by the side margins when the loop therein is moved from the large end toward the small end of the aperture.

18. A fastening device comprising: a hook having a free end and a connected end and defining an enclosed area between the two ends; a keeper connected to the hook at the connected end thereof and being capable of pivoting between a closed position wherein it extends to the free end and an open position wherein it projects into the enclosed area; a shank attached to the connected end of the hook and projecting away from the enclosed area of the hook, the shank having a free end located remote from the connected end of the hook and an aperture which opens laterally out of its sides and is offset from the free end of the shank so that a portion of the shank exists between its free end and aperture; and means for resiliently urging the keeper toward its closed position and for further encircling the shank in the region of the aperture and the portion thereof beyond the aperture such that two rope channels exist between the means and the sides of the shank for accommodating a rope that can be looped through and retained in the aperture, the means being retractable toward the hook sufficiently to expose the aperture so that the rope may be straightened somewhat and maneuvered through aperture.

19. A fastening device according to claim 18 wherein the means includes a coil-type compression spring, the convolutions of which encircle the shank.

20. The fastening device according to claim 18 wherein the means comprises a coil-type compression spring, the convolutions of which encircle the shank and normally cover the aperture.

* * * * *